US011603884B2

United States Patent
Bakkestuen (10) Patent No.: US 11,603,884 B2
(45) Date of Patent: Mar. 14, 2023

(54) GAS BEARING WITH INTEGRAL NON-CONTACTING SEAL

(71) Applicant: TRANE INTERNATIONAL INC., Davidson, NC (US)

(72) Inventor: Robert S. Bakkestuen, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 17/314,578

(22) Filed: May 7, 2021

(65) Prior Publication Data

US 2022/0356904 A1 Nov. 10, 2022

(51) Int. Cl.
*F16C 32/06* (2006.01)
*F16C 33/74* (2006.01)

(52) U.S. Cl.
CPC .......... *F16C 32/0607* (2013.01); *F16C 33/74* (2013.01)

(58) Field of Classification Search
CPC .............. F16C 32/0603; F16C 32/0607; F16C 32/0611; F16C 32/0614; F16C 32/0629; F16C 32/064; F16C 32/0651; F16C 32/0659; F16C 32/0677; F16C 32/0685; F16C 32/0688; F16C 33/74; F16C 33/748; F04D 25/062; F04D 29/057; F04C 2220/40
See application file for complete search history.

(56) References Cited

U.S. PATENT DOCUMENTS

| | | | | |
|---|---|---|---|---|
| 3,734,580 | A | * | 5/1973 | Piscitelli ................ F16J 15/443 384/441 |
| 5,190,440 | A | * | 3/1993 | Maier .................... F04D 29/162 277/412 |
| 9,441,668 | B2 | | 9/2016 | Devitt |
| 9,671,139 | B2 | * | 6/2017 | Creamer ................ F04D 29/462 |
| 10,533,568 | B2 | * | 1/2020 | Goldenberg ........ F04D 29/0473 |
| 10,683,865 | B2 | | 6/2020 | Shaffer et al. |
| 2019/0128273 | A1 | | 5/2019 | Goldenberg |
| 2020/0291953 | A1 | | 9/2020 | Perevozchikov et al. |

FOREIGN PATENT DOCUMENTS

EP 0812996 A2 12/1997
EP 3805529 A1 4/2021

OTHER PUBLICATIONS

Extended European Search Report, European Patent Application No. 22170881.1, dated Oct. 10, 2022 (11 pages).

* cited by examiner

*Primary Examiner* — James Pilkington
(74) *Attorney, Agent, or Firm* — Hamre, Schumann, Mueller & Larson, P.C.

(57) ABSTRACT

A gas bearing for a compressor includes a bearing portion and a sealing portion mounted to a bearing housing of the compressor via one or more dampers, and the sealing portion being fixedly connected to the bearing portion, and a vent with an inlet in the bearing. The bearing portion has an inner radial surface for radially supporting a shaft of the compressor. The sealing portion has a sealing surface. The inlet of the vent disposed between the inner radial surface and the sealing surface. The sealing surface and a rotating surface form a path that extends along the sealing surface. The path extending from a pressurized volume of the compressor to the vent, and the pressurized volume containing a fluid.

19 Claims, 9 Drawing Sheets

GAS BEARING WITH INTEGRAL NON-CONTACTING SEAL

FIELD

This description relates generally to a bearing for a heating, ventilation, air conditioning, and refrigeration (HVACR) system. More specifically, this description relates to a gas bearing and seal assembly for a compressor in the HVACR system.

BACKGROUND

A heating, ventilation, air conditioning, and refrigeration (HVACR) system generally includes a compressor. Compressors, such as, but not limited to, centrifugal compressors, screw compressors, and scroll compressors, utilize bearings to support a spinning shaft. Various types of bearings can be considered, including hydrodynamic oil bearings and ball bearings, which require a lubricant system. In some circumstances, an oil-free operation is preferred. Such systems often utilize a gas bearing. Gas bearings do not utilize an oil-based lubricant, but gas leakages can reduce the capacity of the compressor. Gas bearings requires a clearance to prevent collision between the bearing and the object been supported. For example, the clearance required can be greater than 300 micrometers.

SUMMARY

This description relates generally to a bearing for a heating, ventilation, air conditioning, and refrigeration (HVACR) system. More specifically, this description relates to a gas bearing and seal assembly for a compressor in the HVACR system.

According to an embodiment, a gas bearing for a compressor includes a bearing portion and a sealing portion mounted to a bearing housing of the compressor via one or more dampers, and the sealing portion being fixedly connected to the bearing portion, and, a vent with an inlet in the bearing. The bearing portion has an inner radial surface for radially supporting a shaft of the compressor. The sealing portion has a sealing surface. The inlet of the vent disposed between the inner radial surface and the sealing surface. The sealing surface and a rotating surface form a path that extends along the sealing surface. The path extending from a pressurized volume of the compressor to the vent, and the pressurized volume containing a fluid.

In an embodiment, the rotating surface being an external surface of the rotating shaft.

In an embodiment, the rotating surface being a rotating side wall of an impeller of the compressor.

In an embodiment, the rotating surface being a rotating bottom of an impeller of the compressor.

In an embodiment, the one or more dampers include one or more of a spring, an O-ring, a squeeze film, and a wire mesh.

In an embodiment, the bearing portion and the sealing portion are fixedly connected by machining the sealing portion onto a material of the bearing portion.

In an embodiment, the bearing portion and the sealing portion are fixedly connected by one or more fasteners, by an adhesive, and/or by welding.

In an embodiment, the fluid includes a refrigerant fluidly connected to a refrigeration circuit including a condenser, an expander, an evaporator, and the compressor.

In an embodiment, one or more of the sealing portion and the sealing surface is made from steel, aluminum, ceramic, or graphite, or is coated with graphite.

In an embodiment, one or more of the rotating surface or the sealing surface includes a plurality of teeth, and the path being a tortuous path.

In an embodiment, the plurality of teeth is arranged along a rotational axis of the shaft over one or more of the shaft and a rotating side wall of the impeller.

In an embodiment, the plurality of teeth is arranged radially along a rotating base of the impeller.

A method for reducing a clearance requirement of a seal in a compressor includes mounting a bearing portion and a sealing portion to a bearing housing of the compressor via one or more dampers, fixedly connecting the sealing portion to the bearing portion, radially supporting a shaft of the compressor with an inner radial surface of the bearing portion, and venting the bearing. The sealing portion has a sealing surface. The sealing surface and a rotating surface form a path that extends along the sealing surface. The venting from an inlet of a vent is disposed between the inner radial surface and the sealing surface. The path extends from a pressurized volume of the compressor to the vent, and the pressurized volume contains a fluid.

In an embodiment, the rotating surface being one or more of an external surface of the rotating shaft, a rotating side wall of an impeller of the compressor, and a rotating bottom of an impeller of the compressor.

In an embodiment, the one or more dampers include one or more of a spring, an O-ring, a squeeze film, and a wire mesh.

In an embodiment, the bearing portion and the sealing portion are fixedly connected by machining the sealing portion onto a material of the bearing portion or by one or more fasteners, by an adhesive, and/or by welding.

In an embodiment, the fluid includes a refrigerant fluidly connected to a refrigeration circuit including a condenser, an expander, an evaporator, and the compressor.

In an embodiment, the method further includes cooling one or more of the bearing and the bearing housing with a fluid leakage traveling through the vent in one or more of the bearing portion and in the bearing housing.

In an embodiment, the plurality of teeth is arranged along a rotational axis of the shaft over one or more of the shaft and a rotating side wall of the impeller.

In an embodiment, the plurality of teeth is arranged radially along a rotating base of the impeller.

In an embodiment, the rotating surface and the sealing surface being arranged opposing each other.

By fixedly connecting a gas bearing for a compressor shaft and a labyrinth seal over the shaft and/or an impeller of the compressor, the clearance between a sealing surface of the seal and the shaft or the impeller can be reduced to the same or similar to a clearance between the gas bearing and the shaft. Reducing the clearance between the sealing surface and the shaft and/or impeller can reduce leakage and can increase capacity and efficiency of the compressor.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

This description relates generally to a bearing for a heating, ventilation, air conditioning, and refrigeration (HVACR) system. More specifically, this description relates to a gas bearing and seal assembly for a compressor in the HVACR system.

Figure 1:
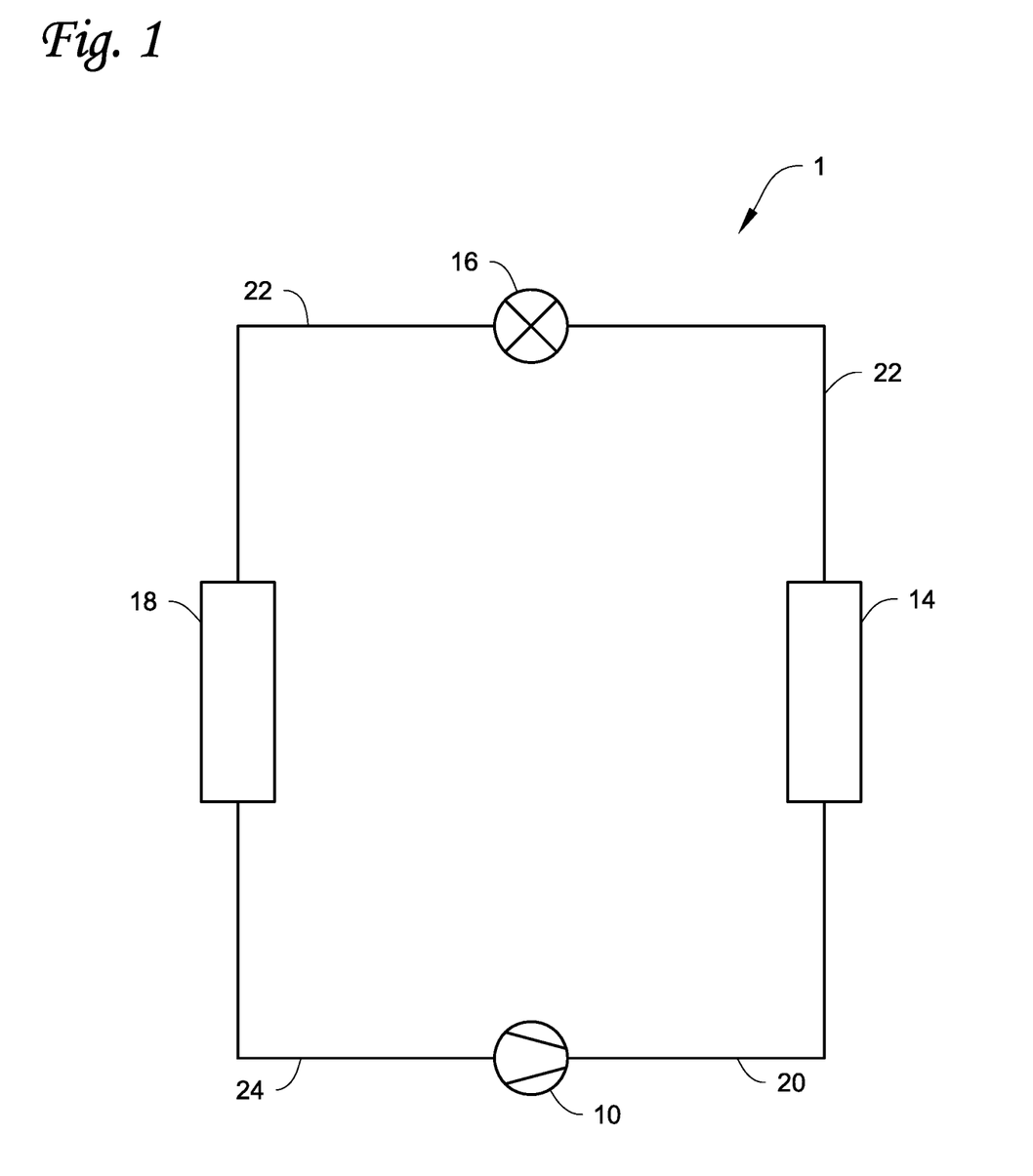
FIG. 1 is a schematic diagram of a refrigeration circuit, according to an embodiment.

FIG. 1 is a schematic diagram of a refrigerant circuit 1, according to an embodiment. The refrigerant circuit 1 generally includes a compressor 10, a condenser 14, an expander 16, and an evaporator 18.

The refrigerant circuit 1 is an example and can be modified to include additional components. For example, in an embodiment, the refrigerant circuit 1 can include other components such as, but not limited to, an economizer heat exchanger, one or more flow control devices, a receiver tank, a dryer, a suction-liquid heat exchanger, or the like.

The refrigerant circuit 1 can generally be applied in a variety of systems used to control an environmental condition (e.g., temperature, humidity, air quality, or the like) in a space (generally referred to as a conditioned space). Examples of such systems include, but are not limited to, HVACR systems, transport refrigeration systems, or the like. Examples of a conditioned space include, but are not limited to, a portion of a home, building, an environmentally controlled container on a vehicle, ship, or vessel, or the like.

The compressor 10, the condenser 14, the expander 16, and the evaporator 18 are fluidly connected via refrigerant lines 20, 22, 24. In an embodiment, the refrigerant lines 20, 22, and 24 can alternatively be referred to as the refrigerant conduits 20, 22, and 24, or the like.

In an embodiment, the refrigerant circuit 1 can be configured to be a cooling system (e.g., an air conditioning system) capable of operating in a cooling mode. In an embodiment, the refrigerant circuit 1 can be configured to be a heat pump system that can operate in both a cooling mode and a heating/defrost mode.

The refrigerant circuit 1 can operate according to generally known principles. The refrigerant circuit 1 can be configured to heat or cool a process fluid (e.g., a heat transfer medium or fluid such as, but not limited to, air, water, water glycol mixture, or the like), in which case the refrigerant circuit 1 may be generally representative of an air conditioner or heat pump.

In operation, the compressor 10 compresses a working fluid (e.g., a heat transfer fluid such as a refrigerant or the like) from a relatively lower pressure gas to a relatively higher-pressure gas. In an embodiment, the compressor 10 can be a centrifugal compressor. In an embodiment, the centrifugal compressor can operate at different speed ranges based on, for example, the compressor size and type. In an embodiment, the compressor 10 can be a screw compressor, a scroll compressor, or the like. In another embodiment, the compressor can include two or more stages of compression.

The relatively higher-pressure gas is also at a relatively higher temperature, which is discharged from the compressor 10 and flows through refrigerant line 20 to the condenser 14. The working fluid flows through the condenser 10 and rejects heat to a process fluid (e.g., water, air, etc.), thereby cooling the working fluid. The cooled working fluid, which is now in a liquid or mostly liquid form, flows to the expander 16 via the refrigerant line 22. The expander 16 reduces the pressure of the working fluid. As a result, a portion of the working fluid is converted to a gaseous form. The working fluid, which is now in a mixed liquid and gaseous form flows to the evaporator 18 via the remainder of refrigerant line 22. The working fluid flows through the evaporator 18 and absorbs heat from a process fluid (e.g., water, air, etc.), heating the working fluid, and converting it to a gaseous form. The working fluid then returns to the compressor 10 via the refrigerant line 24. The above-described process continues while the refrigerant circuit is operating, for example, in a cooling mode (e.g., while the compressor 10 is in operation).

Figure 2:
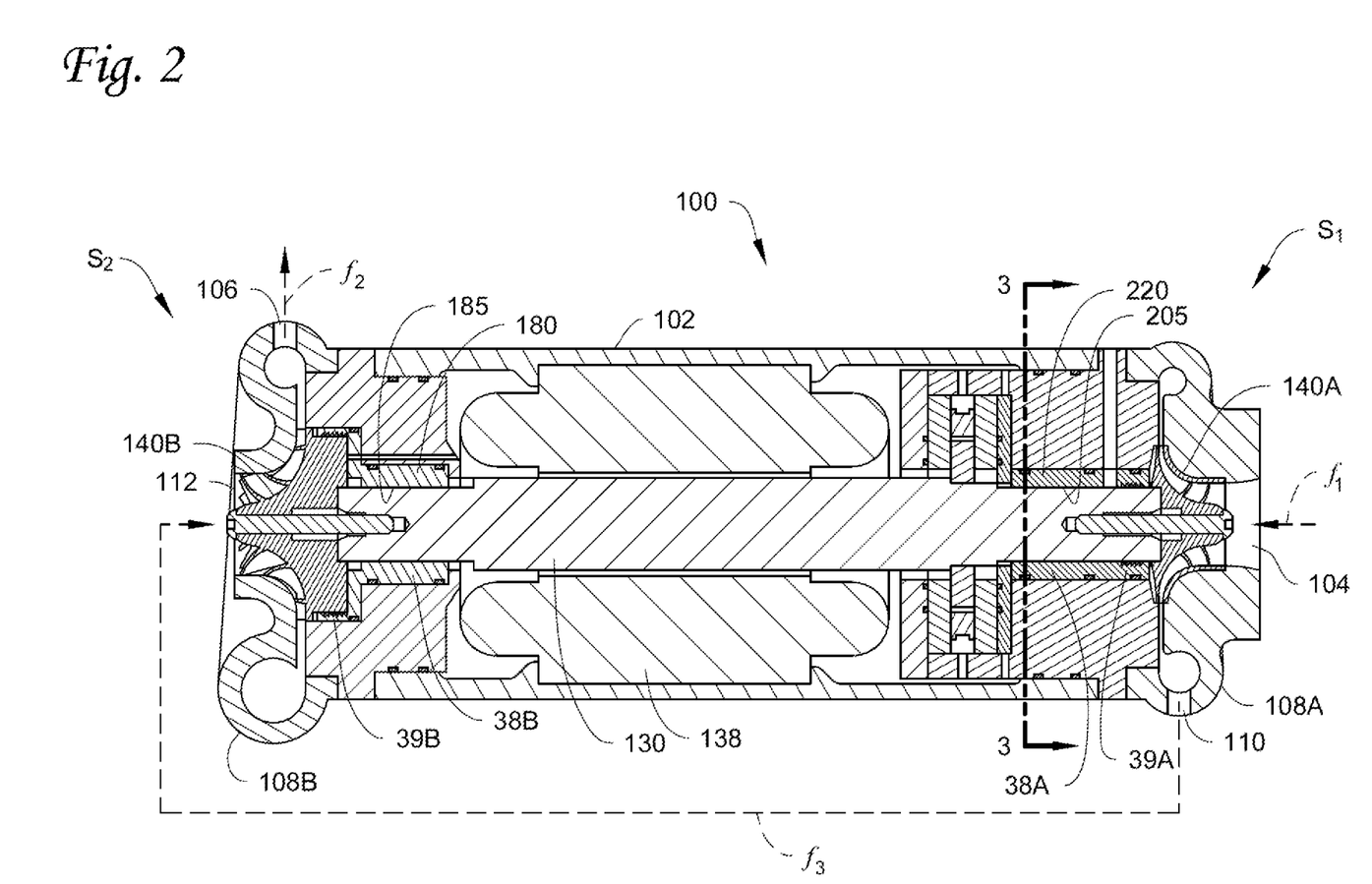
FIG. 2 is a longitudinal cross-sectional view of a compressor, according to an embodiment.

FIG. 2 is a longitudinal cross-sectional view of a compressor 100, according to an embodiment. In an embodiment, the compressor 100 is a centrifugal compressor having two stages. It will be appreciated that the compressor may be other compressor types, such as but not limited to a screw compressor, scroll compressor, and the like. It will be appreciated that the compressor 100 may not have two stages, and may have a single stage. In an embodiment, the centrifugal compressor 100 in FIG. 2 may be the compressor 10 employed in the heat transfer circuit 1 in FIG. 1 to compress a working fluid. The compressor 100 includes a housing 102, a shaft 130, a stator 138, and impellers 140A, 140B. The housing 102 includes an inlet 104, an outlet 106, and endcaps 108A, 108B for the impellers 140A, 140B. The working fluid to be compressed enters the compressor 100 through the inlet 104 as shown by the dashed arrow $f_1$. The compressed working fluid is discharged from the compressor 100 through the outlet 106 as shown by the dashed arrow $f_2$. In an embodiment, the compressor 100 is an oil-free compressor.

Figure 3:
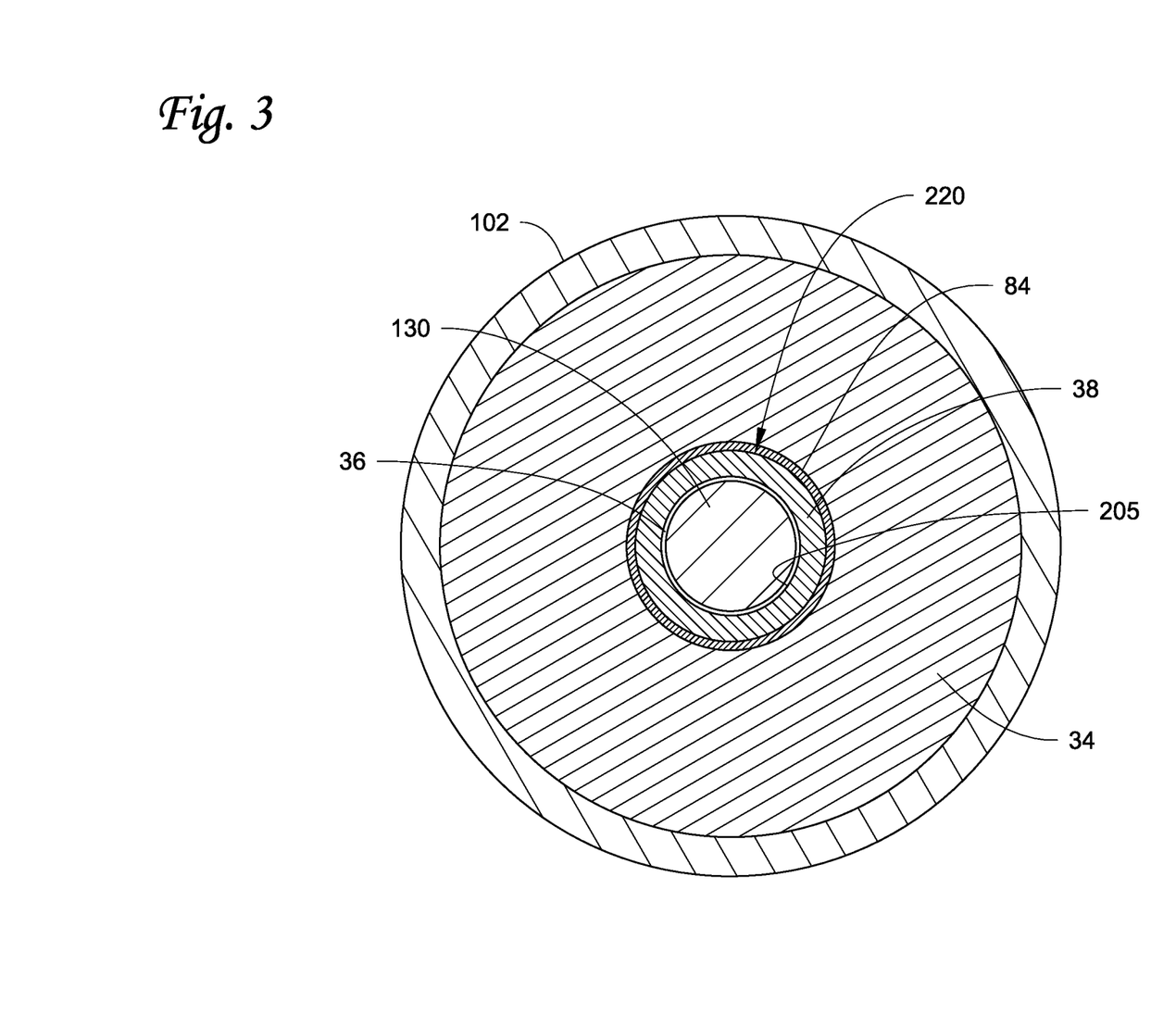
FIG. 3 is a radial cross-sectional view of the compressor along the line 3-3 FIG. 2, according to an embodiment.

The compressor 100 has a first compression stage S1 with the first impeller 140A and a second compression stage S2 with the second impeller 140B. The housing 102 includes an intermediate outlet 110 in the endcap 108A for the first stage S1, and an intermediate inlet 112 in the endcap 108B for the second stage S2. The working fluid flows from the first stage S1 to the second stage S2 through the intermediate outlet 110 and the intermediate inlet 112 as shown by the dashed line $f_3$. In an embodiment, the dashed line $f_3$ may be a line that fluidly connects 110 and 112. The dashed line $f_3$ is shown in FIG. 3 as extending outside of the housing 102. However, it should be appreciated that the flow path shown by the dashed line $f_3$ may extend partially or completely within the housing 102 in an embodiment.

The stator 138 rotates the shaft 130 which rotates the impellers 140A, 140B. The working fluid is compressed in the first stage S1 and the second stage S2 by the rotating impellers 140A, 140B, respectively. A working fluid to be compressed is suctioning through the inlet 104, compressed in the first stage S1, flows from the first stage S1 to the second stage S2, is further compressed in the second stage S2, and is then discharged through the outlet 106. The working fluid discharged from the second stage S2 via the outlet 106 has a higher pressure than the working fluid discharged from the first stage S1 via the intermediate inlet 110.

The compressor 100 includes bearings 180, 220 for supporting the shaft 130 within the housing 102 while the shaft rotates. An inner radial surface 185 of the radial bearing 180 and/or an inner radial surface 205 of the bearing 220 radially support the shaft 130 while it rotates on the inner radial surfaces 185, 205 of the radial bearings 180, 220. The radial bearings 180, 220 can include bearing portions 38A, 38B and sealing portions 39A, 39B reducing a fluid leakage between the bearings 180, 220 and a rotating surface of the compressor 100. The bearing portion 38A, 38B can be a component or segment of the bearings 180, 220 primarily for providing supports to the shaft 130. The sealing portion 39A, 39B can be a component or segment of the bearings 180, 220 primarily for reducing a fluid leakage. The bearing portions 38A, 38B can be radially surrounding the shaft 130 and providing support to shaft 130. The bearing portion 38A, 38B and the sealing portion 39A, 39B can be separated components or segments of the bearings 180, 220. The rotating surface can be an external surface of the rotating shaft 130, a rotating side wall of the impellers 140A, 140B, and/or a rotating bottom of the impellers 140A, 140B.

FIG. 3 is a cross-sectional view of the compressor 100 in FIG. 2. FIG. 3 is a radial cross-section of an example of the gas bearing 220 along line 3-3 of FIG. 2. The gas bearing 180 (shown in FIG. 2) may have features same or similar to the gas bearing 220.

Figure 8:
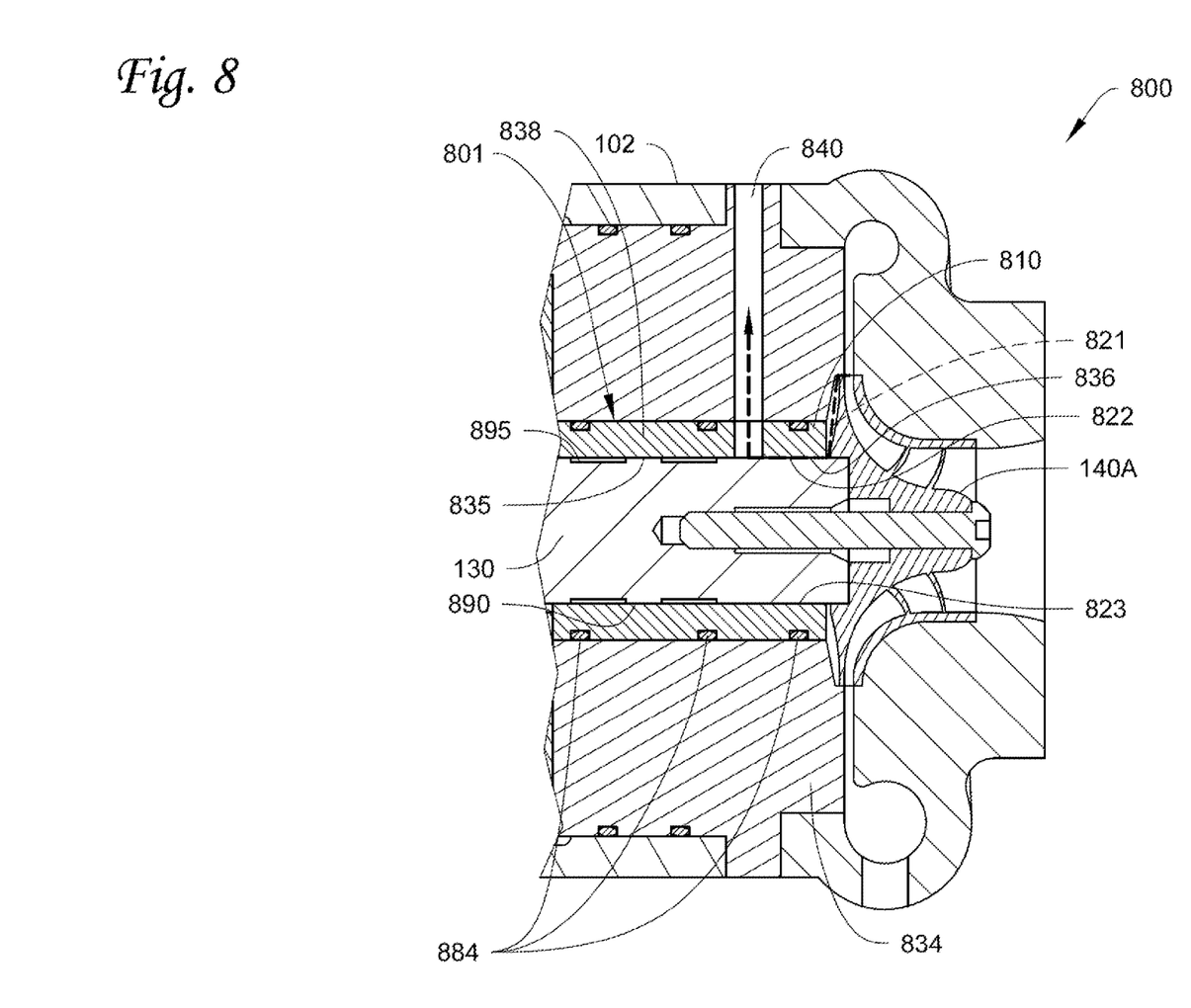
FIG. 8 is a partial longitudinal cross-sectional view of a compressor, according to yet another embodiment

An inner radial surface 205 of the bearing portion 38 provides support to the shaft 130 while it rotates. During operation of the compressor 100, the shaft 130 rotates within the gas bearing 220 with a clearance 36 between the shaft 130 and the bearing portion 38. For example, a layer of compressed gas is formed in the clearance 36 that levitates and supports the rotating shaft 130. In an embodiment, the gas bearing 220 may be an aerostatic gas bearing that utilizes/distributes a flow of compressed gas into the clearance 36 to form the layer of compressed gas. In such an embodiment, the inner radial surface 205 of the bearing portions 38 supports the shaft 130 by providing the compressed gas into the clearance 36 that forms the layer of compressed gas and levitates the shaft 130. In an embodiment, the gas bearing 220 may be a hydrodynamic bearing that utilizes structures on the inner radial surface 205 and/or the external surface of the shaft 130 (e.g., herringbone groves 895 shown in FIG. 8, and the like) to form the layer of compressed gas in the clearance 36. In such an embodiment, the inner radial surface 205 of the bearing portion 38 supports the shaft 130 by having structures or by providing a surface opposite to structures on the external surface of the shaft 130 (e.g., the inner radial surface being a surface opposite to the herringbone grooves 895 as shown in FIG. 8, or the like) to form the layer of compressed gas in the clearance 36.

A differential pressure is provided to a gas bearing, such as the gas bearings 180 (shown in FIG. 2), 200 for radially supporting a rotating object therein. The rotating object can be the compressor shaft 130 when the compressor 100 is in operation. A high pressure and a low pressure can be provided to the gas bearing to provide the differential pressure. For example, the high pressure can be provided to a first end of the gas bearing and the low pressure can be provided to a second end of the gas bearing. For another example, the high pressure can be provided between the first and second end and the low pressure is provided at the first and second ends of the gas bearing. When the high pressure is provided between the two ends, the high pressure can be provided at a midpoint between the first and the second ends. One or more vent can be provided to maintain the low pressure. In an embodiment, the vent can be connected to a compressor inlet to maintain the low pressure.

In the illustrated embodiment, the gas bearing 220 having one or more dampers 84 includes a bearing portion 38 mounted to a bearing housing 34 via the one or more dampers 84. The bearing housing 34 can be disposed radially outward with respect to the shaft 130. At least some of the one or more dampers 84 are disposed between the bearing housing 34 and the bearing portion 38.

In the illustrated embodiment, the gas bearing 220 includes one or more dampers 84. In an embodiment, the one or more dampers 84 can include one or more O-rings, springs, squeeze films, and/or wire meshes. In an embodiment, the one or more dampers 84 can include a plurality of O-rings. In another embodiment, the one or more dampers 84 can include two O-rings. In one embodiment, the one or more dampers 84 can seal a gap between the bearing housing 34 and the bearing portion 38 preventing leakage of fluid through this gap. In another embodiment, a sealing feature (e.g., packing, a different O-ring, a labyrinth seal, or the like) may be disposed downstream from the gap to seal the gap.

Figure 4:
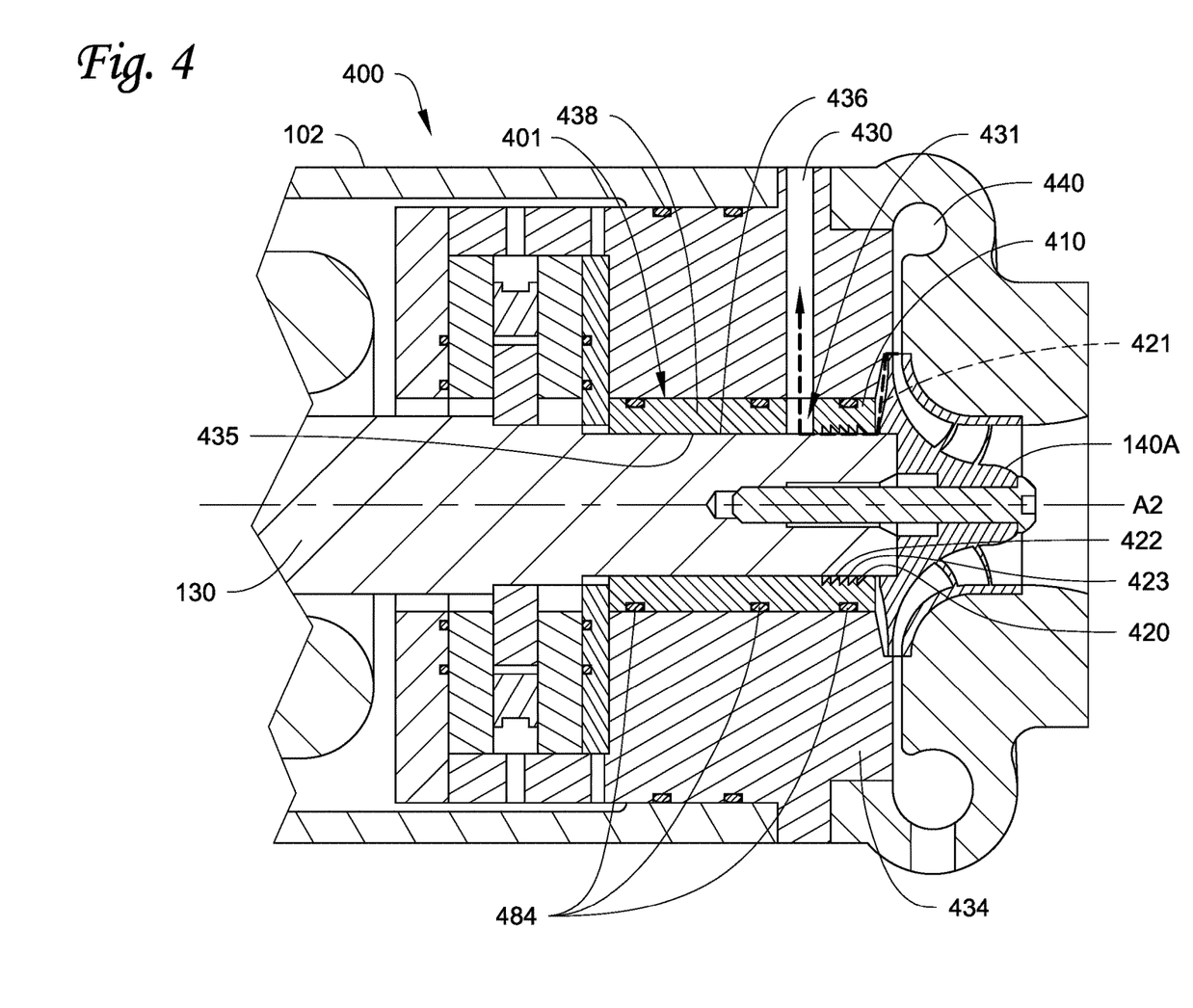
FIG. 4 is a partial longitudinal cross-sectional view of a compressor, according to an embodiment.

FIG. 4 is a partial longitudinal cross-sectional view of a compressor 400. For example, FIG. 4 can be a detailed view of the first stage S1 of the compressor 100 in FIG. 2.

As illustrated in FIG. 4, the compressor 400 includes the shaft 130, the impeller 140A, and a gas bearing 401 having a bearing portion 438 and a sealing portion 410. A clearance 436 is positioned between the bearing portion 438 and the shaft 130. Due to scale, the clearances 436, 536, 636, 736, and 836 in FIGS. 4-8 are generally too small to be clearly illustrated in these views. For example, the clearances 436, 536, 636, 736, and 836 in the illustrated embodiments are around 50 micrometers. Accordingly, the position of the clearances 436, 536, 636, 736, and 836 are generally indicated in FIGS. 4-8. Unless specified below, the compressor 400 can generally have features similar to the compressor 100.

The gas bearing 401 includes the sealing portion 410 fixedly connected with the bearing portion 438. The bearing portion 438 and the sealing portion 410 are compliant mounted to the bearing housing 434 with the plurality of dampers 484. In the illustrated embodiment, the dampers 484 are O-rings. A sealing surface 422 of the sealing portion 410 faces a rotating surface 423 of the compressor 400. The rotating surface 423 is a surface that rotates with the rotating shaft 130. For example, the rotating surface 423 rotates relative to the bearing housing 434 and the housing 102 of the compressor 400. The rotating surface 423 and the sealing surface 422 can be arranged opposing each other. In the illustrated embodiment of FIG. 4, the rotating surface 423 is the rotating surface of the shaft 130 (e.g., the external radial surface of the shaft 130). In other embodiments (e.g., see FIGS. 6 and 7), the rotating surface may be a rotating surface of the impeller 140A and the gas bearing 401 can be thrust bearings against the rotating surface of the impeller as discussed below.

The sealing surface 422 includes a plurality of teeth 420 that creates a tortuous path 421 between the sealing surface 422 and the rotating surface of the shaft 130. The plurality of teeth 420 are in a fixed position relative to the inner radial surface 435 of the bearing portion 438 that supports the shaft 130 as it rotates. The plurality of teeth 420 can be arranged along the rotating outer surface of the shaft 130. As shown in FIG. 4, the plurality of teeth 420 can be arranged along a rotational axis A2 of the shaft 130. Each of the teeth 420 extends around the circumference of the shaft 130. In other embodiments, the plurality of teeth 420 may be additionally or alternatively arranged along a rotating surface of the impeller 140A (e.g., a side wall and/or a rotating base of the impeller) as discussed below (e.g., see FIG. 6 or 7).

The tortuous path 421 reduces fluid leakage by having a series of fluid compressions and expansions when passing through the tortuous path 421, which creates a higher pressure drop across the tortuous path 421 and reduces flowrate of the fluid leakage through the tortuous path 421. This type of sealing provided by the teeth 420 can be referred to as a labyrinth seal. In particular, the tortuous path 421 reduces fluid leakage from a pressurized volume to a vent 430. For example, the pressurized volume can be a pressurized chamber 440 of the compressor 400, the outlet of the impeller 140A, or the like. The "pressurized" chamber/volume/fluid, etc. indicates a pressure at the chamber/volume/fluid, etc. being higher than a fluid pressure at the inlet before the compression (e.g., inlet of the compressor 400, inlet of the impeller 140A, and the like) and does not indicate an absolute or relative fluid pressure over a reference fluid pressure, such as an ambient air pressure or vacuum. The pressurized chamber 440 can be a holding volume for a pressurized fluid after being discharged from the impeller and before the pressurized fluid being discharged from an outlet. For example, the impeller can be the impeller 140A or the impeller 140B, and the outlet can be the outlet 106 or outlet 110, as shown in FIG. 2.

By fixedly connecting the sealing portion 410 to the compliant mounted bearing portion 438 as shown in FIG. 4, the clearance 436 between the sealing surface 422 and the shaft 130 can be reduced. For example, the clearance 436 between the sealing surface 422 and the shaft 130 can be reduced to be the same or similar to the clearance 36 (shown in FIG. 2) between the bearing portion 438 and the shaft 130. The clearance 436 would be larger if the sealing portion 410 is not fixedly connected to the bearing portion 438 when the bearing portion 438 is compliant mounted to the bearing housing 434. A larger clearance would be used for a sealing portion that is not fixedly connected to the bearing portion to account for the general radial movements that occur to the shaft during operation (e.g., normal operation, surge, stall, or the like). The larger clearance to account for shaft movements can be an order of magnitude larger than the minimum clearance for the sealing portion 410 that is fixedly connected to the bearing portion 438 (e.g., the clearance 36 in FIG. 2). By fixedly connecting the sealing portion 410 and the bearing portion 438, the sealing portion 410 is stationary relative to the bearing portion 438. The bearing portion 438 is compliant mounted and moves relative to the bearing housing 434 to maintain a clearance between the shaft 130 and the sealing portion 438. For example, movement of the shaft 130 compresses the layer of compressed gas in the clearance 36 (shown in FIG. 2) between the bearing portion 438 and the shaft 130, which pushes and moves the bearing portion 438 by compression of the damper(s) 484. As the sealing portion 410 is fixedly connected to the bearing portion 438, the movement of the bearing portion 438 ensures a sufficient clearance between the sealing portion 410 and the shaft 130. The reduced clearance between the sealing surface 422 and the shaft 130 can reduce leakage and increase capacity of the compressor 400. The clearance between sealing surface 422 and the shaft 130 can be the radial distance between the teeth 420 and the exterior surface of the shaft 130. In an embodiment, the clearance between the sealing surface 422 and the shaft 130 is less than 300 micrometers. In an embodiment, the clearance between the sealing surface 422 and the shaft 130 is less than 150 micrometers. In an embodiment, the clearance between the sealing surface 422 and the shaft 130 is less than 50 micrometers.

The bearing 401 can include the vent 430 as shown in FIG. 4. The vent 430 allows the fluid leakage from the outlet of the impeller 140A to be released through the bearing 401. As illustrated in FIG. 4, the vent 430 passes through the bearing housing 434 and the bearing 401. The vent 430 extends through the bearing 401 to its internal aperture through which the shaft 130 extends. The fluid leakage can further provide a cooling effect in passing through the bearing housing 434 and the bearing 401. The vent 430 includes a vent inlet 431 disposed between the bearing portion 410 and the sealing portion 438 of the bearing 410. As illustrated in FIG. 4, the vent inlet 431 is disposed between the sealing surface 422 and the inner radial surface 435 of the bearing portion 410.

As shown in the illustrated embodiment of FIG. 4, the sealing portion 410 and the bearing portion 438 are fixedly connected by being integrally formed from a same piece of material. For example, the sealing portion 410 can be machined into the material of bearing portion 438. The material for the sealing portion 410 and/or the bearing portion 438 can be made from steel, aluminum, ceramic, or graphite and/or being coated with graphite.

Figure 5:
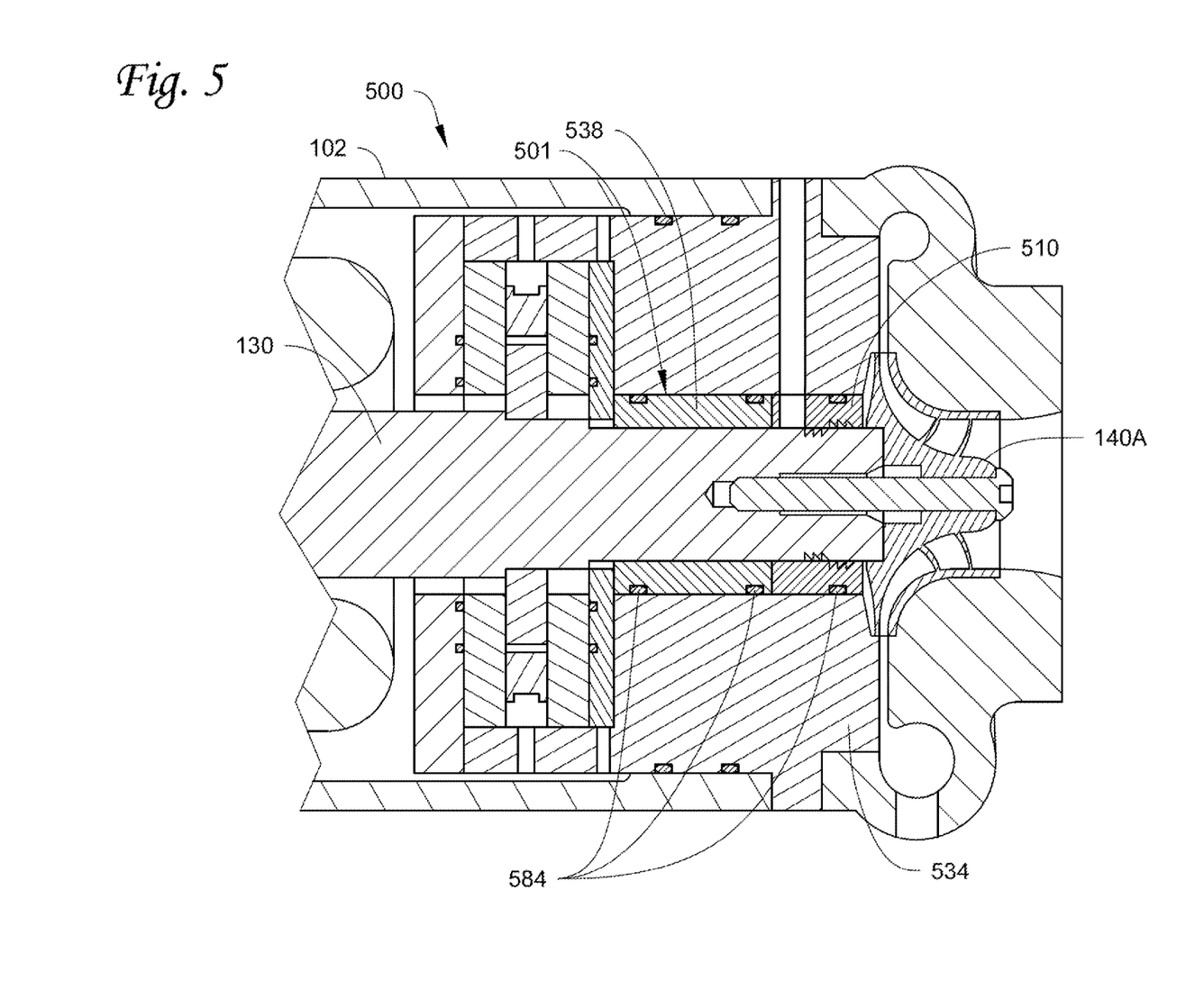
FIG. 5 is a partial longitudinal cross-sectional view of a compressor, according to another embodiment.

FIG. 5 is a partial longitudinal cross-sectional view of a compressor 500, according to another embodiment. As illustrated in FIG. 5, the example of the compressor 500 includes the shaft 130, the impeller 140A, the gas bearing 501 that includes a bearing portion 538 and a sealing portion 510. The gas bearing 501 is compliant mounted to the bearing housing 534 via one or more dampers 584. The sealing portion 510 and the bearing portion 538 are fixedly connected by fixedly attaching the sealing portion 510 and the bearing portion 538. For example, the sealing portion 510 and the bearing portion 538 can be fixedly connected or fixedly attached by one or more adhesives, by one or more fasteners, and/or by welding. Unless specified below, the compressor 500 can generally have features similar to the compressor 100 or 400. Rather than forming the sealing portion 410 and the bearing portion 438 from a same piece of material as illustrated in FIG. 4, the sealing portion 510 and the bearing portion 538 of the gas bearing 501 in FIG. 5 are fixedly connected or attached from assembling two or more components.

Figure 6:
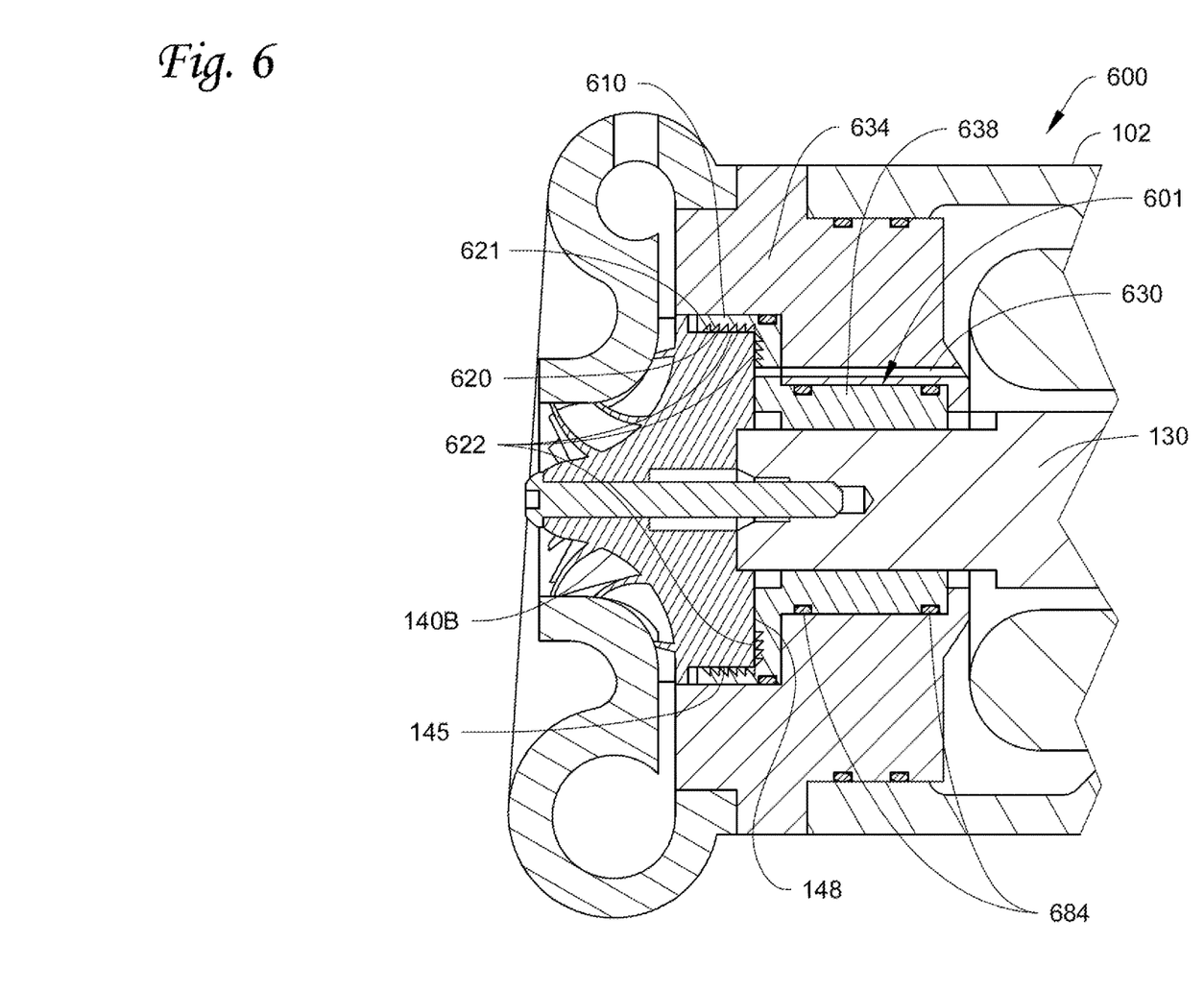
FIG. 6 is a partial longitudinal cross-sectional view of a compressor, according to yet another embodiment.

FIG. 6 is a partial longitudinal cross-sectional view of a compressor 600, according to yet another embodiment. As illustrated in FIG. 6, the example of the compressor 600 includes the shaft 130, the impeller 140B, a gas bearing 601 that includes a bearing portion 638 and a sealing portion 610. The gas bearing 601 is compliant mounted to the bearing housing 634 via one or more dampers 684. In an embodiment, the damper(s) 684 may a similar form/configuration as discussed above for the dampers 84 in FIG. 2 and/or the dampers 484 in FIG. 3. Unless specified below, the compressor 600 can generally have features similar to the compressor 100, 400, or 500.

According to the illustrated embodiment, the bearing portion 638 and the sealing portion 610 are compliant mounted to the bearing housing 634 with the damper(s) 784. The gas bearing 601 can include a sealing portion 610 fixedly connected with the bearing portion 638. A sealing surface 622 of the sealing portion 610 includes a plurality of teeth 620 creating a tortuous path 621 between the sealing surface and the impeller 140B. The plurality of teeth 620 can be arranged along the impeller 140B and/or radially surrounding the impeller 140B. In an embodiment, the plurality of teeth 620 is positioned against a rotating side wall 145 of the impeller 140B. In another embodiment, the plurality of teeth 620 is positioned against a rotating bottom 148 of the impeller 140B. The rotating bottom 148 spins around a rotational axis A2 (shown in FIG. 4) of the shaft 130.

The gas bearing 601 includes a vent 630. The tortuous path 621 extends to the vent 630. The tortuous path 621 reduces fluid leakage by having a series of compressions and expansions when passing through the tortuous path 621, which creates a higher pressure drop across the tortuous path 621 and reduces flowrate of the fluid leakage through the tortuous path 621. The vent 630 has a vent inlet disposed between the bearing portion 610 and the sealing portion 638 of the bearing 610 (e.g., along the axial direction of the shaft 130). The vent 630 extends through the bearing 601 to its internal aperture through which the shaft 130 extends. In particular, as shown in FIG. 6, the vent 630 extends to the portion of the internal aperture in which the impeller 140B is disposed. The vent inlet is disposed between the sealing surface 622 of the sealing portion and the inner radial surface of the bearing portion 638. As shown in the illustrated embodiment, the vent 630 passes through the bearing housing 634.

According to the illustrated embodiment, the sealing portion 610 and the bearing portion 638 can be fixedly connected by forming from a same piece of material. According to another embodiment, the sealing portion 610 can be machined into the bearing portion 38. According to yet another embodiment, the sealing portion 610 and/or the bearing portion 638 can be made from steel, aluminum, ceramic, or graphite and/or being coated with graphite.

Rather than forming the sealing portion 510 around the shaft 130 as illustrated in FIG. 5, the sealing portion 610 in FIG. 6 is formed around the rotating side wall 145 or the rotating bottom 148 of the impeller 140B.

Figure 7:
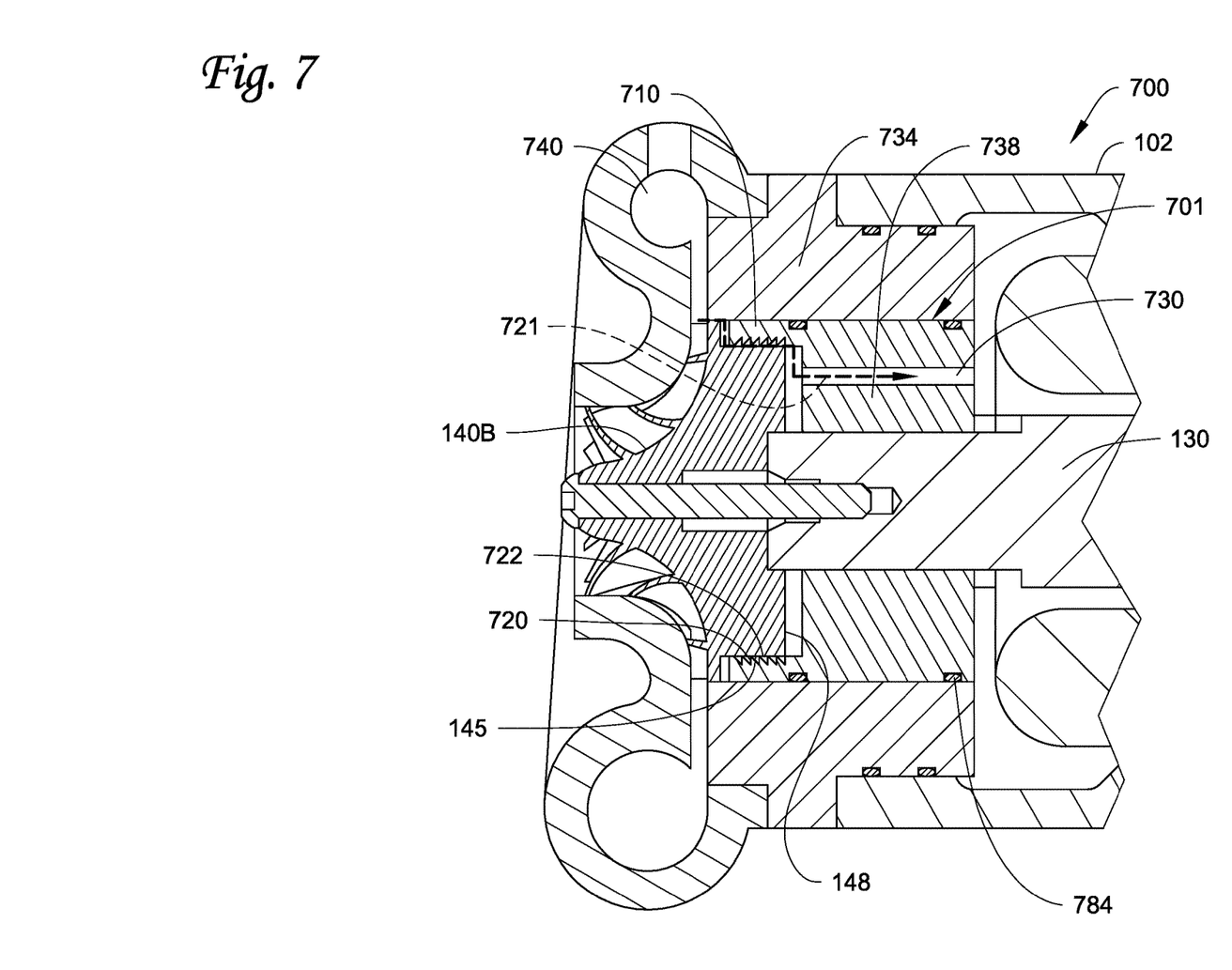
FIG. 7 is a partial longitudinal cross-sectional view of a compressor, according to yet another embodiment.

FIG. 7 is a partial longitudinal cross-sectional view of the compressor 700, according to yet another embodiment. As illustrated in FIG. 7, the example of the compressor 700 includes the shaft 130, the impeller 140B, a gas bearing 701 that includes a bearing portion 738 and a sealing portion 710. The bearing portion 738 supports the shaft 130 when the compressor 700 is in operation. Unless specified below, the compressor 700 can generally have features similar to the compressor 100, 400, 500, or 600.

The bearing portion 738 and the sealing portion 710 are compliant mounted to the bearing housing 734 with one or more dampers 784. In an embodiment, the damper(s) 784 may be a similar form/configuration as discussed above for the dampers 84 in FIG. 2 and/or the dampers 484 in FIG. 3. The gas bearing 701 can include a sealing portion 710 fixedly connected with the bearing portion 738. A sealing surface 722 of the sealing portion 710 includes a plurality of teeth 720 creating a tortuous path 721 between the sealing surface 722 and the impeller 140B. The tortuous path 721 reduces fluid leakage by having a series of compressions and expansions when passing through the tortuous path 721, which creates a higher pressure drop across the tortuous path 721 and reduces flowrate of the fluid leakage through the tortuous path 721. For example, the pressurized volume 740 can be the pressurized chamber of the compressor 700. In an embodiment, the plurality of teeth 720 and the impeller 140B can form one or more labyrinth seal.

In an embodiment, the plurality of teeth 720 is positioned against a rotating side wall 145 of the impeller 140B. In another embodiment, a plurality of teeth is positioned against a rotating bottom 148 of the impeller 140B alternatively or additionally to the plurality of teeth 720 positioned against the rotating side wall 145.

The bearing 701 can includes a vent 730 that allows the fluid leakage to be released from the bearing 701. The vent 730 can pass through the bearing portion 738. The fluid leakage can further provide cooling effect passing through the bearing 701. Compared to the bearing 601 of FIG. 6, the bearing 701 of FIG. 7 can include a bearing housing 738 thicker than the bearing housing 638. The thicker bearing housing 738 allows the vent 730 to be positioned in the bearing housing 738.

According to one embodiment, the plurality of teeth can be included on the rotating surface of the shaft or the impellers opposing the sealing surface of the sealing portion of the bearing, instead of being on the sealing surface of the sealing portion. For example, the plurality of teeth 420, 520, 620, and 720 can be included on the rotating surface of the shaft or the impellers (e.g., the rotating surface 423 of the shaft 130 in FIG. 4, the rotating side wall 145, the rotating bottom 148, and the like). For example, teeth on the rotating surface 423 of the shaft 130 can be recessed into the rotating surface 423 to create the rotating path 421.

FIG. 8 is a partial longitudinal cross-sectional view of a compressor 800, according to yet another embodiment. As illustrated in FIG. 8, the example of the compressor 800 includes the shaft 130, the impeller 140A, a gas bearing 801 that includes a bearing portion 838 and a sealing portion 810. The gas bearing 801 is compliant mounted to the bearing housing 834 via one or more dampers 884. A clearance 836 is positioned between the bearing portion 838 and the shaft 130. In an embodiment, the damper(s) 884 may a similar form/configuration as discussed above for the dampers 84 in FIG. 2 and/or the dampers 484 in FIG. 3. Unless specified below, the compressor 800 can generally have features similar to the compressor 100, 400, 500, 600, 700.

The gas bearing 801 includes the sealing portion 810 fixedly connected with the bearing portion 838. The bearing portion 838 and the sealing portion 810 are compliant mounted to the bearing housing 834 with the plurality of dampers 884. In the illustrated embodiment, the dampers 884 are O-rings. A sealing surface 822 of the sealing portion 810 faces a rotating surface 823 of the compressor 800. The rotating surface 823 is a surface that is rotated by the rotating shaft 130. For example, the rotating surface 823 rotates relative to the bearing housing 834 and a housing the compressor 800. The rotating surface 823 and the sealing surface 822 can be arranged opposing each other. In the illustrated embodiment, the rotating surface 423 is the rotating surface of the shaft 130 (e.g., the external radial surface of the shaft 130). A vent 840 is disposed between the bearing portion 838 and the sealing portion 810. Specifically, an inlet of the vent 840 disposed between the sealing surface 822 of the sealing portion 810 and an inner radial surface 835 of the bearing portion 838.

A path 821 is created between the sealing surface 822 and the rotating surface 823 of the shaft 130. The sealing surface 822 is in a fixed position relative to the inner radial surface of the bearing portion 838 that supports the shaft 130 as it rotates. Rather than forming, for example, the tortuous path 421 as shown in FIG. 4, the embodiment of FIG. 8 reduces fluid leakage by creating a path 821 between the sealing surface 822 and the rotating surface 823 that oppose each other across a clearance 836. The sealing surface 822 faces the rotating surface 823. In an embodiment, the clearance between the sealing surface 822 and the shaft 130 is less than 300 micrometers. In an embodiment, the clearance 836 between the sealing surface 822 and the shaft 130 is less than 150 micrometers. In an embodiment, the clearance 836 between the sealing surface 822 and the shaft 130 is less than 50 micrometers.

In an embodiment, the bearing portion 838 can be positioned opposing a levitating surface 890 of the shaft 130. The levitating surface 890 is on a portion of the external radial surface of the shaft 130 opposing the inner radial surface 835 of the bearing portion 838. When the compressor 800 is in operation, the shaft 130 rotates and creates a compressed fluid layer between the bearing portion 838 and the levitating surface 890 supporting the shaft 130 in place. For example, the levitating surface 890 can include herringbone grooves 895 to create the compress fluid layer supporting the shaft 130. In another example, a compressed fluid source provides compressed fluid to the body of the bearing portion 838 via a compressed fluid conduit. The compressed fluid is provided to the body of the bearing portion 838 and dispersed across the bearing portion 838 (e.g., the bearing 801 configured to have the compressed fluid dispersed from the inner radial surface 835 of the bearing portion 838 into the clearance 836). The dispersion can be achieved, for example, by including a porous material nearing the inner surface of the bearing portion 838 and conducting the compressed fluid from the compressed fluid conduit across the inner surface of the bearing portion 838.

Rather than forming a tortuous path between the sealing portion and rotating surface as in, for example, FIG. 4, the illustrated embodiment in FIG. 8 includes a path 821 reducing fluid leakage by having the sealing surface 822 and the rotating surface 823 opposing each other with a small clearance to introduce back pressure and reduce a flowrate of fluid through the path 821. For example, the sealing portion 810 can be a bushing seal. It is appreciated that the sealing portion can be formed from a combination of seals as shown and described in FIGS. 2-8.

Figure 9:
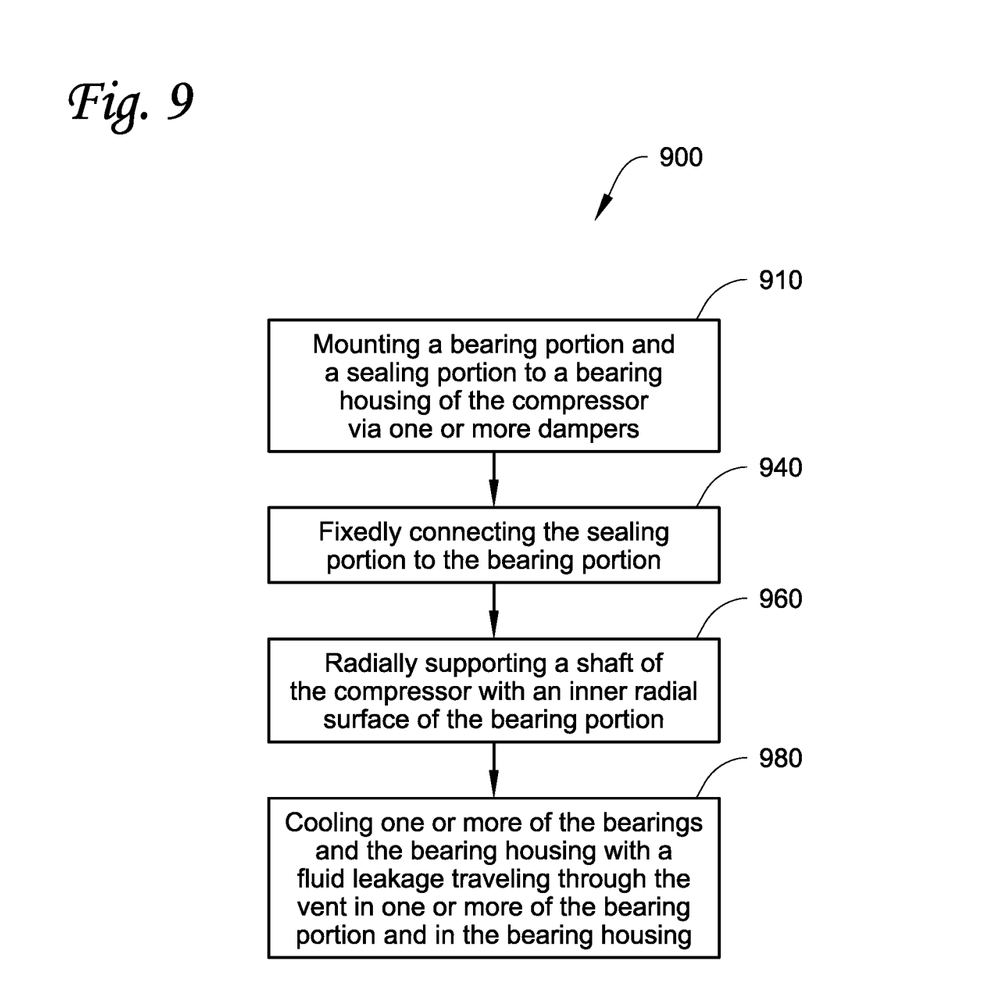
FIG. 9 is a flowchart of a method for reducing a clearance requirement of a seal in a compressor, according to an embodiment.

FIG. 9 is a flowchart of a method 900 for reducing a clearance requirement of a seal in a compressor, according to an embodiment. In an embodiment, the method 900 may be employed by the compressor 100, the compressor 400, the compressor 500, the compressor 600, the compressor 700, or the compressor 800. The method 900 starts at 901.

At 910, a bearing portion (e.g., bearing portion 438, 538, 638, 738, 838) and a sealing portion (e.g., sealing portion 410, 510, 610, 710, 810) are mounted to a bearing housing (e.g., bearing housing 434, 534, 634, 734, 834) of a compressor via one or more dampers (e.g., dampers 484, 684, 784, 884). The method 900 then proceeds to 920.

The method 900 further includes fixedly connecting the sealing portion to the bearing portion (e.g., bearing portion 438, 538, 638, 738, 838) 940, radially supporting a shaft of the compressor (e.g., shaft 130) with an inner radial surface of the bearing portion 960, and cooling one or more of the bearing and the bearing housing with a fluid leakage traveling through the vent (e.g., vent 430, 630, 730, 840) in one or more of the bearing portion and in the bearing housing 980.

Aspects

It is to be appreciated that any one of aspects 1-12, and 21 can be combined with any one of aspects 13-20.

Aspect 1. A gas bearing for a compressor, comprising:
a bearing portion and a sealing portion mounted to a bearing housing of the compressor via one or more dampers, and the sealing portion being fixedly connected to the bearing portion; and
a vent with an inlet in the bearing, wherein
the bearing portion has an inner radial surface for radially supporting a shaft of the compressor,
the sealing portion has a sealing surface,
the inlet of the vent disposed between the inner radial surface and the sealing surface,
the sealing surface and a rotating surface form a path that extends along the sealing surface,
the path extending from a pressurized volume of the compressor to the vent, and
the pressurized volume containing a fluid.

Aspect 2. The bearing of aspect 1, wherein
the rotating surface being an external surface of the rotating shaft.

Aspect 3. The bearing of any one of aspects 1-2, wherein
the rotating surface being a rotating side wall of an impeller of the compressor.

Aspect 4. The bearing of any one of aspects 1-3, wherein
the rotating surface being a rotating bottom of an impeller of the compressor.

Aspect 5. The bearing of any one of aspects 1-4, wherein
the one or more dampers include one or more of a spring, an O-ring, a squeeze film, and a wire mesh.

Aspect 6. The bearing of any one of aspects 1-5, wherein
the bearing portion and the sealing portion are fixedly connected by machining the sealing portion onto a material of the bearing portion.

Aspect 7. The bearing of any one of aspects 1-6, wherein
the bearing portion and the sealing portion are fixedly connected by one or more fasteners, by an adhesive, and/or by welding.

Aspect 8. The bearing of any one of aspects 1-7, wherein
one or more of the rotating surface or the sealing surface includes a plurality of teeth, and
the path being a tortuous path.

Aspect 9. The bearing of any one of aspects 1-8, wherein
the fluid includes a refrigerant fluidly connected to a refrigeration circuit including a condenser, an expander, an evaporator, and the compressor.

Aspect 10. The bearing of any one of aspects 1-9, wherein
one or more of the sealing portion and the sealing surface is made from steel, aluminum, ceramic, or graphite, or is coated with graphite.

Aspect 11. The bearing of any one of aspects 1-10, wherein
the plurality of teeth is arranged along a rotational axis of the shaft over one or more of the shaft and a rotating side wall of the impeller.

Aspect 12. The bearing of any one of aspects 1-11, wherein
the plurality of teeth is arranged radially along a rotating base of the impeller.

Aspect 13. A method for reducing a clearance requirement of a seal in a compressor, comprising:
mounting a bearing portion and a sealing portion to a bearing housing of the compressor via one or more dampers;
fixedly connecting the sealing portion to the bearing portion;

radially supporting a shaft of the compressor with an inner radial surface of the bearing portion; and venting the bearing, wherein the sealing portion has a sealing surface, the sealing surface and a rotating surface form a path that extends along the sealing surface, venting from an inlet of a vent is disposed between the inner radial surface and the sealing surface, the path extending from a pressurized volume of the compressor to the vent, and the pressurized volume containing a fluid.

Aspect 14. The method of aspect 13, wherein the rotating surface being one or more of an external surface of the rotating shaft, a rotating side wall of an impeller of the compressor, and a rotating bottom of an impeller of the compressor.

Aspect 15. The method of any one of aspects 13-14, wherein the one or more dampers include one or more of a spring, an O-ring, a squeeze film, and a wire mesh.

Aspect 16. The method of any one of aspects 13-15, wherein the bearing portion and the sealing portion are fixedly connected by machining the sealing portion onto a material of the bearing portion or by one or more fasteners, by an adhesive, and/or by welding.

Aspect 17. The method of any one of aspects 13-16, wherein the fluid includes a refrigerant fluidly connected to a refrigeration circuit including a condenser, an expander, an evaporator, and the compressor.

Aspect 18. The method of any one of aspects 13-17, further comprising cooling one or more of the bearing and the bearing housing with a fluid leakage traveling through the vent in one or more of the bearing portion and in the bearing housing.

Aspect 19. The method of any one of aspects 13-18, wherein the plurality of teeth is arranged along a rotational axis of the shaft over one or more of the shaft and a rotating side wall of the impeller.

Aspect 20. The method of any one of aspects 13-19, wherein the plurality of teeth is arranged radially along a rotating base of the impeller.

Aspect 21. The bearing of any one of aspects 1-12, wherein the rotating surface and the sealing surface being arranged opposing each other.

The terminology used in this specification is intended to describe particular embodiments and is not intended to be limiting. The terms "a," "an," and "the" include plural forms as well, unless clearly indicated otherwise. The terms "comprises" and/or "comprising," when used, indicated the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" may, but does not necessarily, refer to the same embodiment. The embodiments and disclosure are examples only. Other and further embodiments may be devised without departing from the basic scope thereof, with the true scope and spirit of the disclosure being indicated by the claims that follow.

What is claimed is:

1. A gas bearing for a compressor, comprising:
   a bearing portion and a sealing portion mounted to a bearing housing of the compressor via one or more dampers, and the sealing portion being fixedly connected to the bearing portion; and
   a vent with an inlet in the gas bearing, wherein
   the bearing portion has an inner radial surface for radially supporting a shaft of the compressor,
   the sealing portion has a sealing surface,
   the inlet of the vent disposed between the inner radial surface and the sealing surface,
   the sealing surface and a rotating surface form a path that extends along the sealing surface,
   the path extending from a pressurized volume of the compressor to the vent, and
   the pressurized volume containing a fluid.

2. The gas bearing of claim 1, wherein the rotating surface being an external surface of the rotating shaft.

3. The gas bearing of claim 1, wherein the rotating surface being a rotating side wall of an impeller of the compressor.

4. The gas bearing of claim 1, wherein the rotating surface being a rotating bottom of an impeller of the compressor.

5. The gas bearing of claim 1, wherein the one or more dampers include one or more of a spring, an O-ring, a squeeze film, and a wire mesh.

6. The gas bearing of claim 1, wherein
   the bearing portion and the sealing portion are fixedly connected by machining the sealing portion onto a material of the bearing portion.

7. The gas bearing of claim 1, wherein
   the bearing portion and the sealing portion are fixedly connected by, by an adhesive, and/or by welding.

8. The gas bearing of claim 1, wherein
   one or more of the rotating surface or the sealing surface includes a plurality of teeth, and
   the path being a tortuous path.

9. The gas bearing of claim 1, wherein
   the fluid includes a refrigerant fluidly connected to a refrigeration circuit including a condenser, an expander, an evaporator, and the compressor.

10. The gas bearing of claim 1, wherein
    one or more of the sealing portion and the sealing surface is made from steel, aluminum, ceramic, or graphite, or is coated with graphite.

11. The gas bearing of claim 1, wherein
    a plurality of teeth are arranged along a rotational axis of the shaft over one or more of the shaft and a rotating side wall of an impeller.

12. The gas bearing of claim 1, wherein
    a plurality of teeth are arranged radially along a rotating base of an impeller.

13. A method for providing a gas hearing in a compressor comprising:
    mounting a bearing portion and a sealing portion to a bearing housing of the compressor via one or more dampers to form the gas bearing, the sealing portion being fixedly connected to the bearing portion:
    radially supporting a shaft of the compressor with an inner radial surface of the bearing portion; and
    venting the gas bearing, Wherein
    the sealing portion has a sealing surface,
    the sealing surface and a rotating surface form a path that extends along the sealing surface,
    the venting of the gas hearing is from an inlet of a vent disposed between the inner radial surface and the sealing surface, the path extending from a pressurized volume of the compressor to the vent, and the pressurized volume containing a fluid.

14. The method of claim 13, wherein the rotating surface being one or more of an external surface of the rotating shaft, a rotating side wall of an impeller of the compressor, and a rotating bottom of an impeller of the compressor.

15. The method of claim 13, wherein the one or more dampers include one or more of a spring, an O-ring, a squeeze film, and a wire mesh.

16. The method of claim 13, wherein the bearing portion and the sealing portion are fixedly connected by machining the sealing portion onto a material of the bearing portion or by fastening, by an adhesive, and/or by welding.

17. The method of claim 13, wherein the fluid includes a refrigerant fluidly connected to a refrigeration circuit including a condenser, an expander, an evaporator, and the compressor.

18. The method of claim 13, further comprising cooling one or more of the bearing and the bearing housing with a fluid leakage traveling through the vent in one or more of the hearing portion and in the hearing housing.

19. The method of claim 13, wherein a plurality of teeth is arranged along a rotational axis of the shaft over one or more of the shaft and a rotating side wall of an impeller.

\* \* \* \* \*

UNITED STATES PATENT AND TRADEMARK OFFICE
CERTIFICATE OF CORRECTION

| | |
|---|---|
| PATENT NO. | : 11,603,884 B2 |
| APPLICATION NO. | : 17/314578 |
| DATED | : March 14, 2023 |
| INVENTOR(S) | : Bakkestuen |

It is certified that error appears in the above-identified patent and that said Letters Patent is hereby corrected as shown below:

In the Claims

Column 14, Line 33, Claim 7: Delete "connected by, by an adhesive," and insert --connected by fastening, by an adhesive,--.

Signed and Sealed this
Twenty-seventh Day of June, 2023

Katherine Kelly Vidal
*Director of the United States Patent and Trademark Office*